United States Patent
Gretz

(10) Patent No.: US 8,404,971 B1
(45) Date of Patent: Mar. 26, 2013

(54) CAMERA MOUNTING ASSEMBLY INCLUDING AN ELECTRICAL BOX FOR MOUNTING A HIGH OR LOW VOLTAGE SECURITY CAMERA

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 236 days.

(21) Appl. No.: 12/932,759

(22) Filed: Mar. 4, 2011

Related U.S. Application Data

(63) Continuation-in-part of application No. 12/592,811, filed on Dec. 3, 2009, now Pat. No. 8,148,635, and a continuation-in-part of application No. 12/462,027, filed on Jul. 28, 2009, now Pat. No. 8,148,634, and a continuation-in-part of application No. 12/456,156, filed on Jun. 12, 2009, now Pat. No. 8,076,575.

(51) Int. Cl.
*H02G 3/08* (2006.01)

(52) U.S. Cl. .............. 174/50; 174/481; 174/53; 174/58; 220/3.2; 220/3.3; 220/4.02; 248/906

(58) Field of Classification Search .................. 174/480, 174/481, 50, 53, 57, 58, 559, 560, 561, 562; 220/3.2–3.9, 4.02; 248/906, 343
See application file for complete search history.

(56) References Cited

U.S. PATENT DOCUMENTS

| | | | |
|---|---|---|---|
| 5,032,856 A | 7/1991 | McMinn | |
| 5,790,910 A | 8/1998 | Haskin | |
| 5,939,671 A * | 8/1999 | Gretz | 174/50 |
| 6,033,129 A | 3/2000 | Foye | |
| 6,133,843 A * | 10/2000 | Davidson | 174/50 |
| 6,476,856 B1 | 11/2002 | Zantos | |
| 6,678,001 B1 | 1/2004 | Elberbaum | |
| 7,183,483 B1 * | 2/2007 | Anderson et al. | 174/50 |
| 7,593,142 B2 * | 9/2009 | Marszalek et al. | 174/50 |

* cited by examiner

*Primary Examiner* — Angel R Estrada

(57) ABSTRACT

A camera mounting assembly for mounting a security camera, detector, or electrical fixture directly to an indoor or outdoor surface. The camera mounting assembly includes an electrical box with adapted for use with several mounting adapters. A ceiling mounting adapter enables mounting the electrical box directly to the ceiling or to a down rod secured to the ceiling. A wall mounting adapter enables mounting the electrical box directly to a wall. A corner mounting adapter enables mounting the electrical box to an outside corner. The mounting adapters include a substantially thick face plate that can accept fasteners for securing a camera or fixture directly to the face portion. A camera adapter plate and a mounting bar are provided for mounting cameras or fixtures having a small base diameter.

19 Claims, 16 Drawing Sheets

CAMERA MOUNTING ASSEMBLY INCLUDING AN ELECTRICAL BOX FOR MOUNTING A HIGH OR LOW VOLTAGE SECURITY CAMERA

This application is a Continuation-In-Part of U.S. patent application Ser. No. 12/592,811 filed Dec. 3, 2009, now U.S. Pat. No. 8,148,635, and is a Continuation-In-Part of U.S. patent application Ser. No. 12/462,027 filed Jul. 28, 2009, now U.S. Pat. No. 8,148,634, and is a Continuation-In-Part of U.S. patent application Ser. No. 12/456,156 filed Jun. 12, 2009, now U.S. Pat. No. 8,076,575, the entire contents of which are incorporated herein by reference.

FIELD OF THE INVENTION

This invention relates to the installation of electrical components and specifically to an electrical box mounting assembly for mounting a security camera or an electrical fixture on a wall, ceiling, a corner, or similar surface.

BACKGROUND OF THE INVENTION

Security cameras and electrical fixtures are commonly installed on the interiors and exteriors of buildings. Security cameras are frequently installed to provide monitoring of property against intrusion, vandalism, or theft. Electrical fixtures, such as lighting fixtures, are also frequently installed in similar locations. Electrical fixtures typically run on house current and therefore all electrical connections to the fixtures must be contained within a closed electrical box that is in compliance with local electrical codes. Although most security cameras are powered by 24 volts, many jurisdictions now require that the electrical connections also be contained within a closed electrical box that meets the local electrical code. Conventional electrical boxes are typically not adaptable to accepting either a security camera or an electrical fixture, which therefore forces the installer to purchase an electrical box that is specifically adapted to either the security camera or to the electrical fixture. It would therefore be beneficial to provide an electrical box assembly that was adaptable to use with both security cameras and electrical fixtures.

U.S. patent application Ser. No. 12/456,156, which includes common ownership and a common inventor with the present invention, disclosed a one-piece nonmetallic electrical box assembly for mounting and supporting a security camera or electrical fixture and to overcome some of the deficiencies of the aforementioned conventional electrical boxes. The electrical box assembly disclosed therein was universal in nature and could be adapted for use with a wide variety of security cameras or electrical fixtures.

U.S. patent application Ser. No. 12/462,027, which also includes common ownership and a common inventor with the present invention, disclosed an electrical box assembly for those locations in which the local electrical code does not permit nonmetallic electrical boxes. The disclosure included a metallic electrical box and a nonmetallic trim piece for installing an electrical fixture or a security camera on a wall or ceiling.

U.S. patent application Ser. No. 12/592,811, which also includes common ownership and a common inventor with the present invention, disclosed a camera mounting assembly including a mounting bar and adapter plate that enabled the mounting of a security camera to any conventional 3-inch or 4-inch electrical box or 2"×3" device box in addition to the electrical box disclosed in the aforementioned patent applications. By extending the mounting bar outside the walls of an electrical box the mounting bar and adapter plate enabled the mounting of substantially all commercially sold camera housings.

Although the parent applications provided novel solutions to mounting security cameras and electrical devices, they utilized electrical boxes that were mounted within the walls thus requiring in a new work situation that a hole be formed in the wall to accommodate the electrical box. What is needed therefore is an electrical box that can be surface-mounted to a myriad of surfaces, both indoors and outdoors, and provide an attractive and unobtrusive visible mounting platform for security cameras, electrical fixtures and the like.

SUMMARY OF THE INVENTION

The invention is a camera mounting assembly that enables the mounting of a security camera, detector, or an electrical fixture directly to an indoor or outdoor surface. The camera mounting assembly includes an electrical box with an electrical enclosure therein and a mounting adapter. Several mounting adapters are provided for mounting the electrical box in a specific location. A ceiling mounting adapter enables mounting the electrical box directly to the ceiling or to a down rod secured to the ceiling. A wall mounting adapter enables mounting the electrical box directly to a wall. A corner mounting adapter enables mounting the electrical box to an outside corner. The mounting adapters include a substantially thick face portion that can be drilled to accommodate fasteners for securing a camera or fixture directly to the face portion. A camera adapter plate and a mounting bar are provided for mounting cameras or fixtures having a base diameter smaller than the width of the electrical enclosure.

OBJECTS AND ADVANTAGES

Several advantages are achieved with the camera mounting assembly of the present invention, including:

(1) The camera mounting assembly provides all the hardware required to rapidly mount a security camera, detector, or electrical fixture to a variety of surfaces.
(2) The camera mounting assembly does not require an existing electrical box and therefore provides great flexibility to the installer in the choice of potential mounting locations for security cameras and detectors.
(3) The camera mounting assembly is adapted to mount to a threaded down rod thereby enabling the installer to mount the security camera at the proper distance from the floor to obtain the desired camera field of view.
(4) The camera mounting assembly has demonstrated unexpected results in reducing the time and effort to mount a security camera to a surface.
(5) The camera mounting assembly will accommodate security cameras of substantially any diameter.
(6) The camera mounting assembly includes a plurality of threaded openings leading into the electrical enclosure thereby enabling the direct attachment of threaded electrical conduit to the electrical box.
(7) The camera mounting assembly is adaptable for connection to down rods of various sizes.

These and other objects and advantages of the present invention will be better understood by reading the following description along with reference to the drawings.

INDEX TO REFERENCE NUMERALS IN DRAWINGS

| | |
|---|---|
| 30 | camera mounting assembly, first embodiment |
| 32 | electrical box |
| 34 | mounting adapter, first embodiment |
| 36 | security camera |
| 38 | down rod |
| 40 | outer wall |
| 42 | inner wall |
| 44 | back wall |
| 46 | electrical enclosure |
| 48 | face plate |
| 50 | flat surface of face plate |
| 52 | cable passageway or cable port |
| 54 | outer end or threaded end of cable passageway |
| 56 | inner end of cable passageway |
| 58 | threads |
| 60 | axis through cable passageway |
| 62 | rim of electrical box |
| 64 | cylindrical wall |
| 66 | strut |
| 67 | central opening |
| 68 | aperture in back wall |
| 70 | U-shaped recess |
| 72 | boss in electrical box |
| 74 | bore in boss |
| 76 | short boss |
| 77 | outer wall extension |
| 78 | peripheral wall surrounding aperture |
| 79 | flat face |
| 80 | base plate of mounting adapter |
| 82 | opening in base plate |
| 84 | edge of base plate |
| 86 | peripheral wall |
| 88 | center wall portion |
| 89 | inner surface |
| 90 | sloped wall portion |
| 91 | outer surface |
| 92 | outer wall portion |
| 93 | end of threaded sleeve |
| 94 | internally threaded sleeve |
| 95 | peripheral lip |
| 96 | plate boss |
| 97 | plate boss bore |
| 100 | rim of mounting adapter |
| 102 | brace |
| 104 | camera support assembly |
| 106 | down rod |
| 110 | camera mounting assembly, second embodiment |
| 112 | mounting adapter, second embodiment |
| 114 | bracket |
| 116 | flange |
| 118 | aperture |
| 120 | side brace |
| 130 | electrical box mounting arrangement |
| 132 | electrical box and mounting adapter assembly |
| 134 | fastener |
| 138 | knockout wall section in electrical box |
| 140 | corner adapter |
| 142 | base |
| 144 | base plate |
| 146 | aperture in base plate |
| 148 | wing |
| 150 | side portion |
| 152 | strut |
| 154 | aperture in wing |
| 156 | corner |
| 158 | fastener |
| 160 | fastener |
| 162 | threaded plug |
| 164 | mounting plate |
| 166 | hole |

-continued

| | |
|---|---|
| 170 | ceiling |
| 171 | fastener |
| 172 | fastener |
| 173 | camera mounting arrangement |
| 174 | camera mounting assembly, third embodiment |
| 176 | mounting bar |
| 178 | adapter plate |
| 180 | fastener |
| 182 | prong |
| 184 | small diameter security camera |
| 186 | central opening |
| 188 | wiring opening |
| 190 | peripheral wall |
| 192 | recessed area |
| 194 | bore |
| 196 | prong engagement member |
| 198 | adapter plate assembly or camera and plate assembly |
| 200 | flange on adapter plate |
| 201 | twist-locking arrangement |
| 202 | fastener |
| 204 | end boss |
| 206 | reducing bushing |
| 208 | bore |
| 210 | internal threads |
| Θ1 | angle between wings of corner adapter |

DETAILED DESCRIPTION OF THE INVENTION

Figure 1:
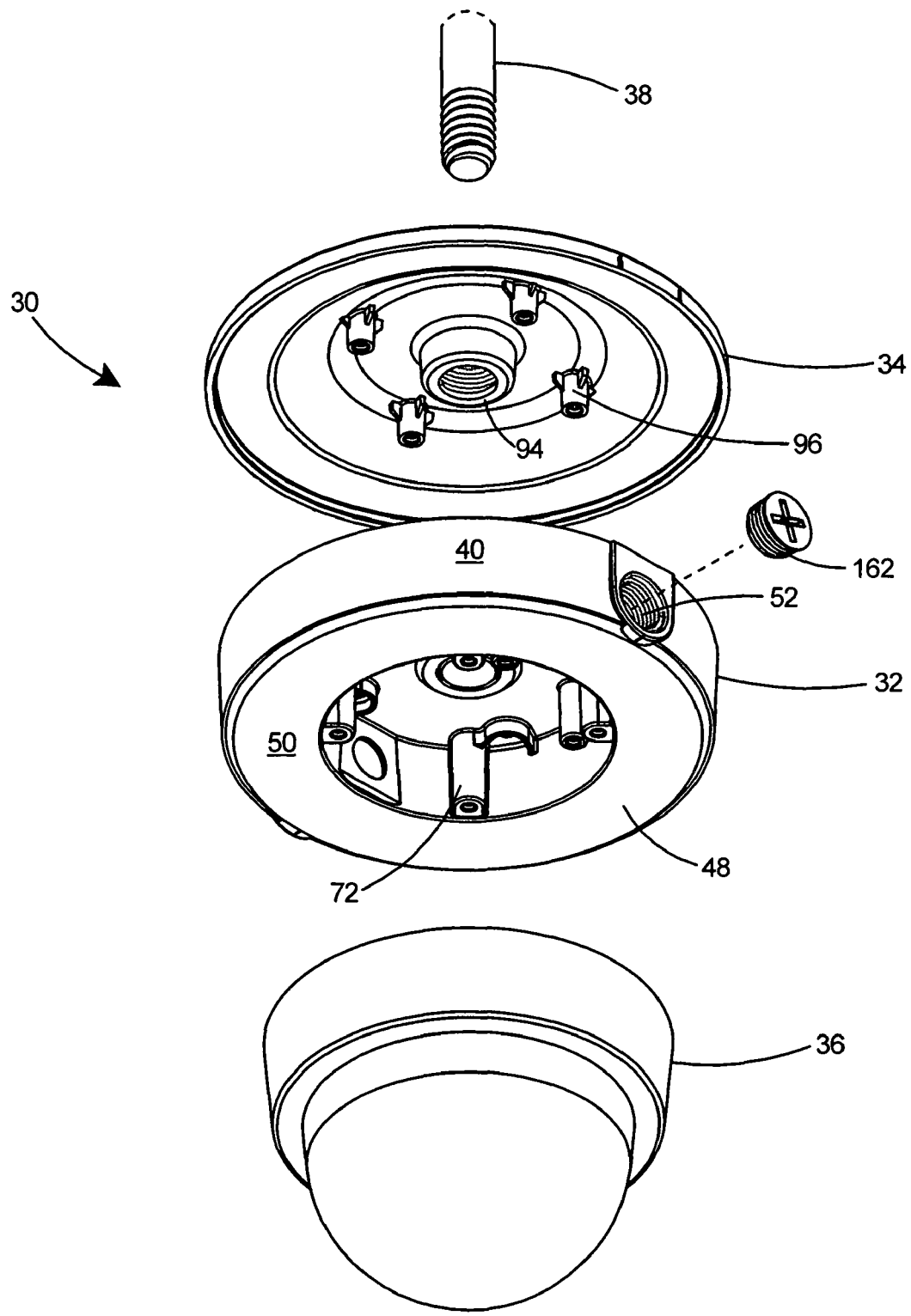
FIG. 1 is an exploded perspective view of a first and preferred embodiment of a camera mounting assembly according to the present invention.

Referring to FIG. 1 there is shown a first and preferred embodiment of a camera mounting assembly 30 according to the present invention, with portions of the assembly exploded away for clarification. The camera mounting assembly 30 includes a one-piece electrical box 32 and a mounting adapter 34 that are used to secure a conventional security camera 36 to a down rod 38 or ceiling (not shown).

Figure 16:
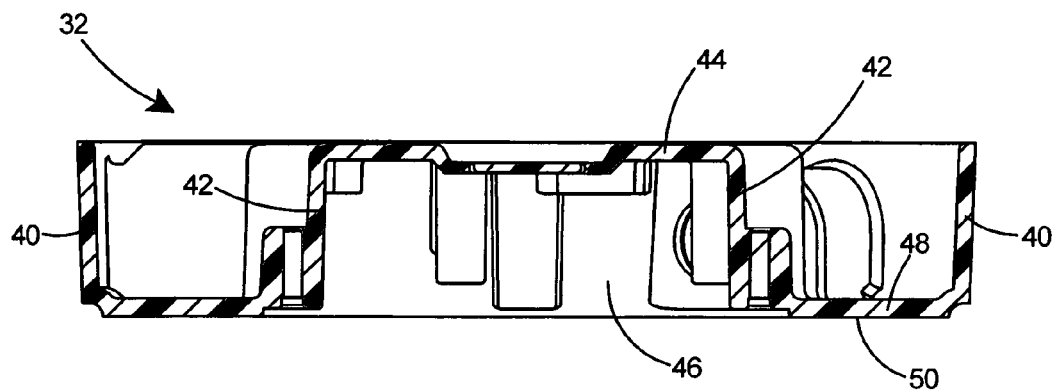
FIG. 16 is a sectional view of the electrical box taken along line 16-16 of FIG. 14.
Figure 17:
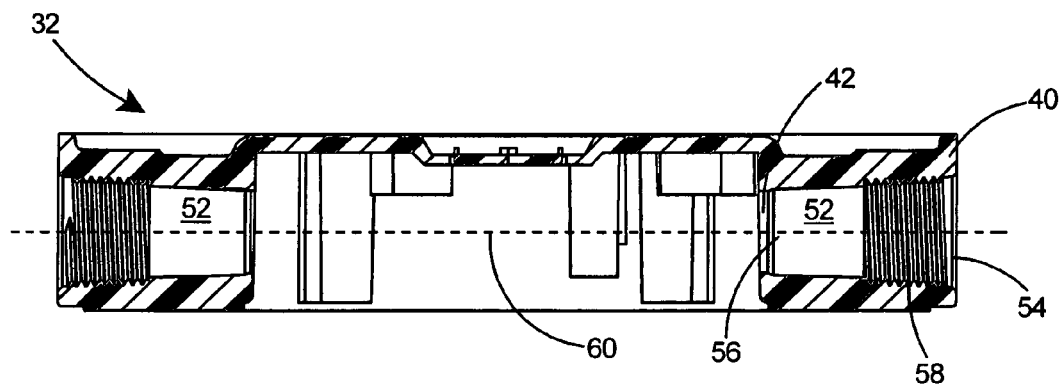
FIG. 17 is a sectional view of the electrical box taken along line 17-17 of FIG. 14.
Figure 18:
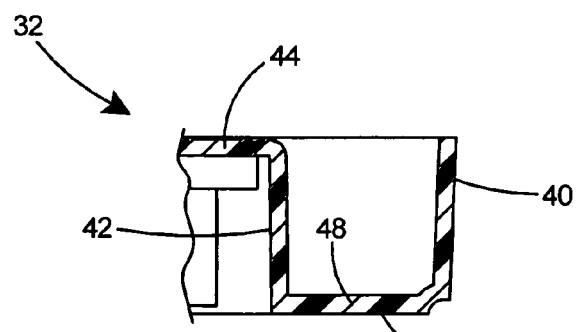
FIG. 18 is a sectional view of the electrical box taken along line 18-18 of FIG. 14.

With reference to FIGS. 16-18, the electrical box 32 includes an outer wall 40, an inner wall 42, and a back wall 44 defining an electrical enclosure 46 therein. A substantially thick face plate 48 extends between the outer wall 40 and inner wall 42 and includes a flat surface 50 that can be drilled to accept fasteners for connecting a security camera or other electrical fixture to the electrical box 32. The electrical box 32 further includes one or more cable passageways 52 extending between the outer wall 40 and the inner wall 42. Each cable passageway 52 includes an outer end 54 and an inner end 56 and threads 58 at the outer end 54. The threaded end 54 of the cable passageway 52 enables rotational attachment of threaded electrical conduit (not shown) to the electrical box 32. As shown in the preferred embodiment of the electrical box depicted in FIG. 17, two cable passageways 52 are provided on opposing sides of the electrical box 32 and the cable passageways 52 are axially aligned along axis 60.

Figure 19:
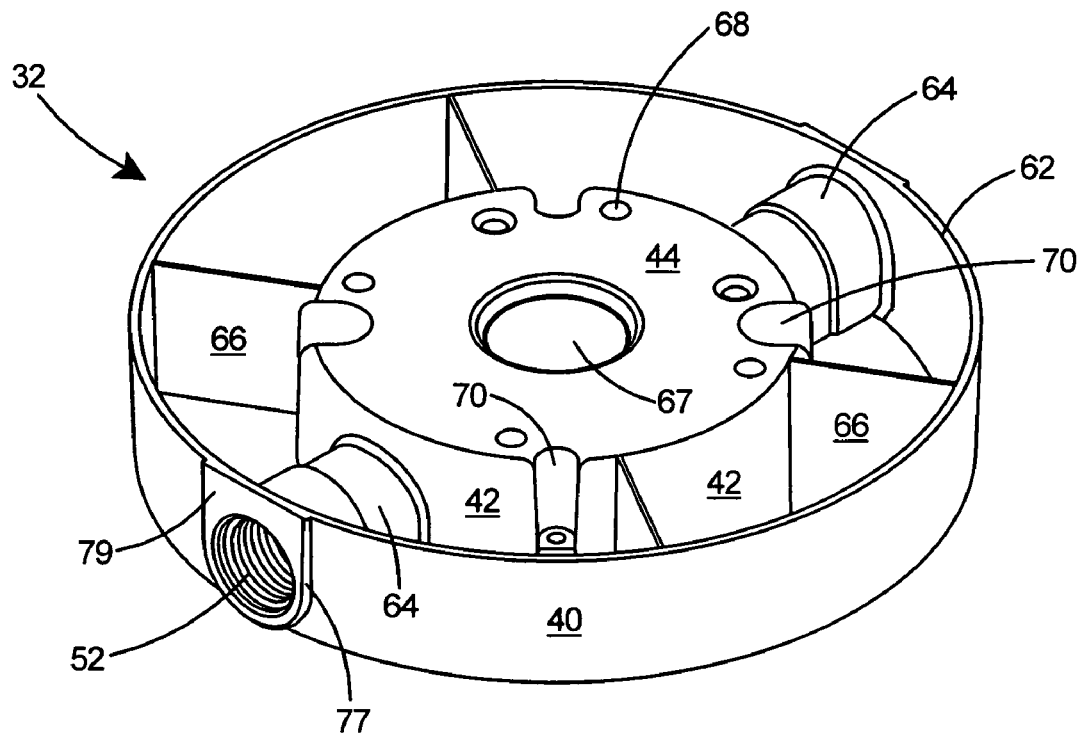
FIG. 19 is a top perspective view of the electrical box of FIG. 14.

As shown in FIG. 19, the outer wall 40 includes a planar rim 62 and a cylindrical wall 64 surrounding the cable passageways 52. A plurality of struts 66 extend radially between the inner wall 42 and outer wall 40 and, along with the cylindrical walls 64 braces and supports the outer wall 40 and strengthens and adds rigidity to the electrical box 32. The back wall 44 of the electrical box 32 includes a central opening 67 and a plurality of apertures 68 therein. The central opening 67 provides a passageway for electrical cables (not shown) into the electrical enclosure 46 and the apertures 68 will accommodate fasteners when securing the electrical box 32 to a mounting adapter (not shown). U-shaped recesses 70 in the back wall 44 minimize the amount of material required to produce the electrical box 32 of the present invention when the box is molded of plastic.

Figure 20:
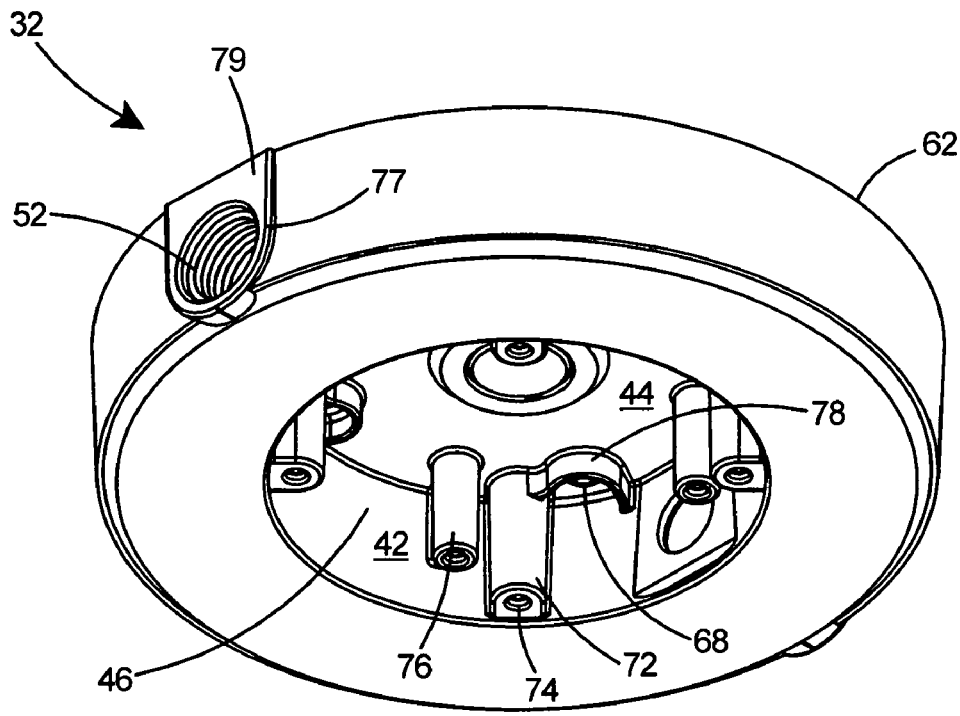
FIG. 20 is a bottom perspective view of the electrical box of FIG. 14.

With reference to FIG. 20, the interior of the electrical enclosure 46 includes a plurality of bosses 72 with each of the bosses including a bore 74 therein. The bosses 72 are integral with the inner wall 42 and the back wall 44 of the electrical box 32. The bores 74 in the bosses 72 of the electrical box 32 are capable of accepting fasteners (not shown) from a camera mounting arrangement which will be described herein with respect to a preferred embodiment.

Figure 14:
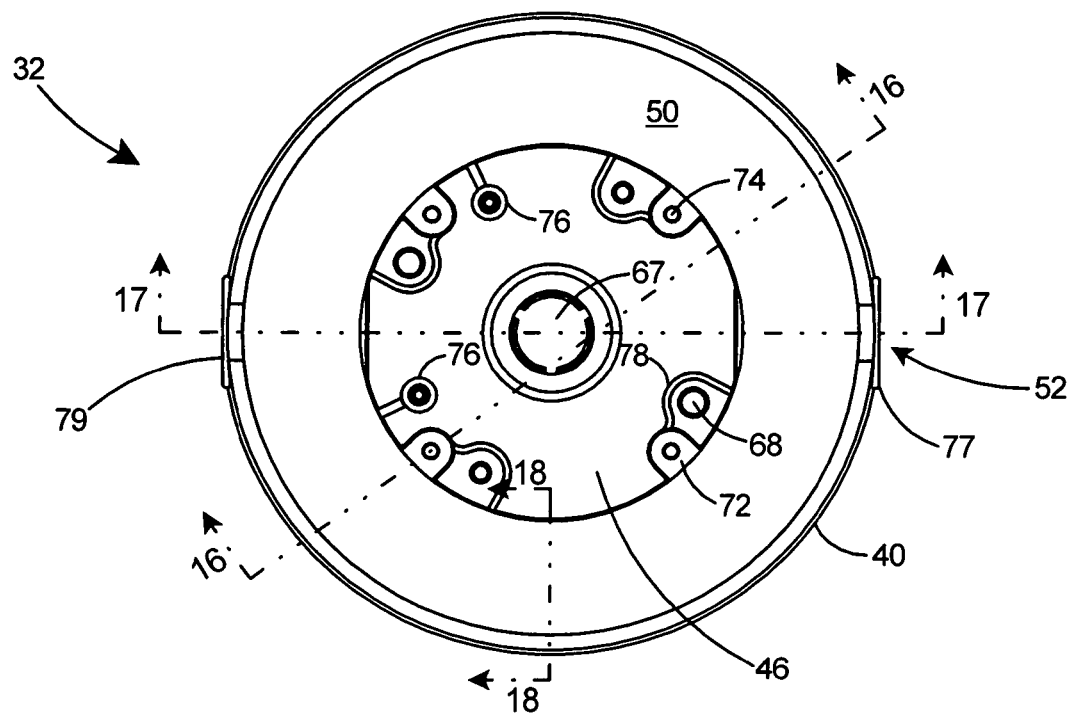
FIG. 14 is a front view of an electrical box that forms a portion of the camera mounting assembly of the present invention.
Figure 15:
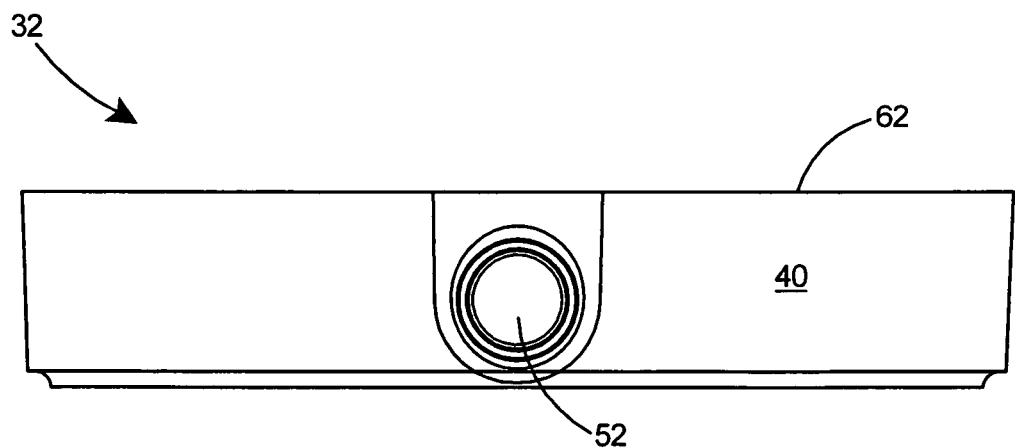
FIG. 15 is a side view of the electrical box of FIG. 14.

The electrical box 32 further includes one or more short bosses 76 extending from the back wall 44. A peripheral wall 78 is provided surrounding each of the apertures 68 in the back wall 44. The peripheral walls 78 are integral with the inner wall 42 on one end and integral with a boss 72 on the opposite end. After fasteners (not shown) are inserted within the apertures 68 to secure the electrical box to a mounting adapter (not shown), the peripheral walls 78 will shield the fasteners and serve to minimize the possibility of contact between the electrical wiring within the electrical enclosure 46 and the fasteners, which could cause an electrical short. The reader is referred to FIG. 14 for a view of an especially preferred layout or arrangement of the bosses 72, apertures 68, central opening 67, peripheral walls 78, and other elements within the electrical enclosure 46 of the electrical box 32. The electrical box 32 further includes an outer wall extension 77 on the outer wall 40 surrounding each cable passageway 52. The outer wall extension 77 provides a flat face 79 to enable the shoulder of a threaded conduit (not shown) to fit flush against the outer wall of the electrical box.

Figure 2:
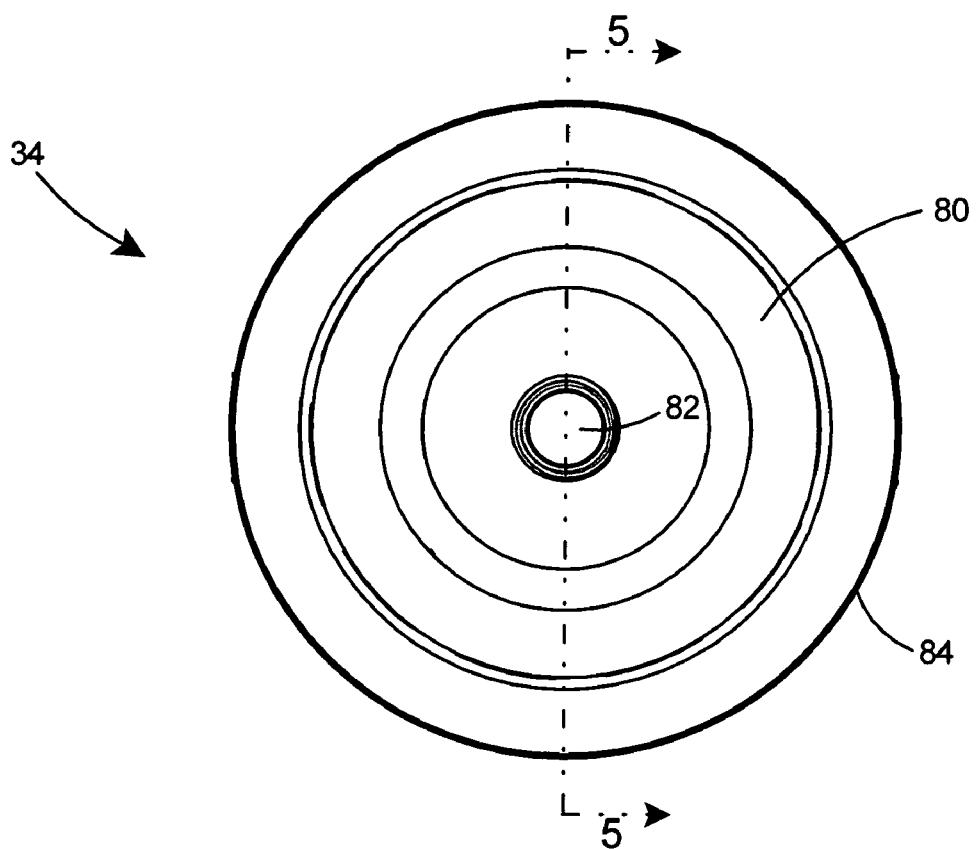
FIG. 2 is a top view of a first embodiment of a mounting adapter that forms a portion of the camera mounting assembly of FIG. 1.
Figure 3:
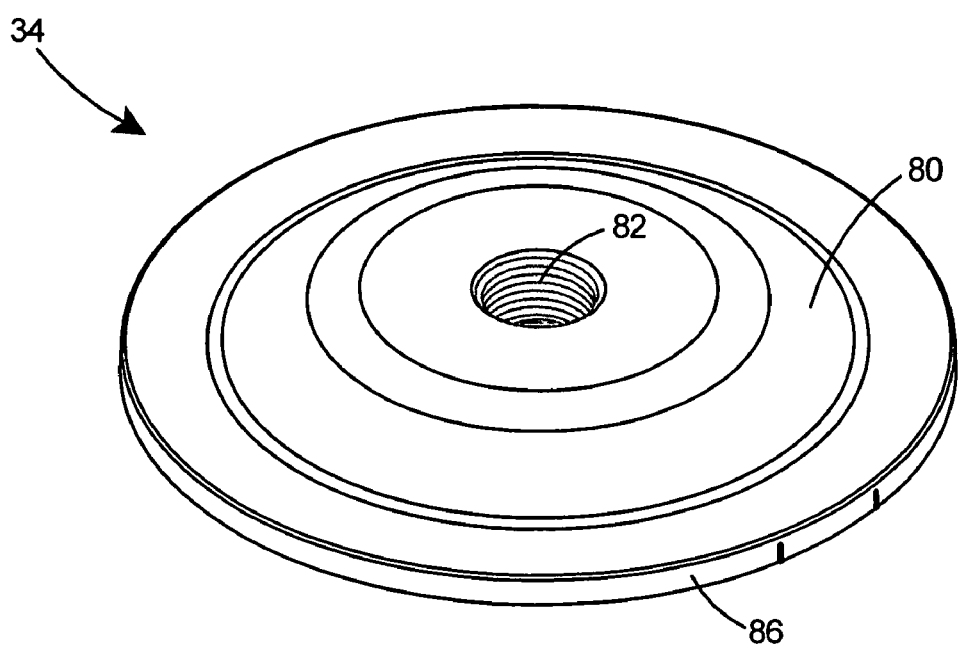
FIG. 3 is a top perspective view of the mounting adapter of FIG. 2.

With reference to FIGS. 2 and 3, there is shown a first embodiment of a mounting adapter 34 that forms a portion of the camera mounting assembly of the present invention. The mounting adapter 34 includes a substantially circular base plate 80 having an opening 82 therein and an edge 84. A peripheral wall 86 extends from the edge 84 of the base plate 80.

Figure 4:
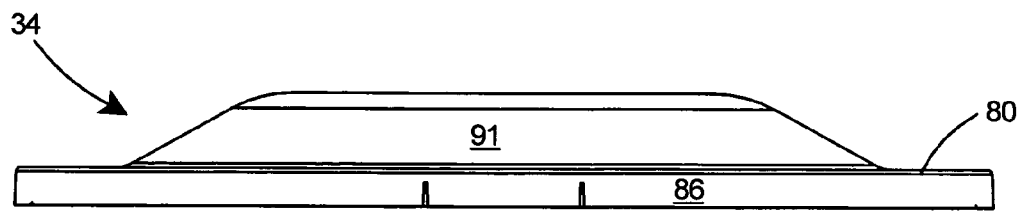
FIG. 4 is a side view of the mounting adapter of FIG. 2.
Figure 5:
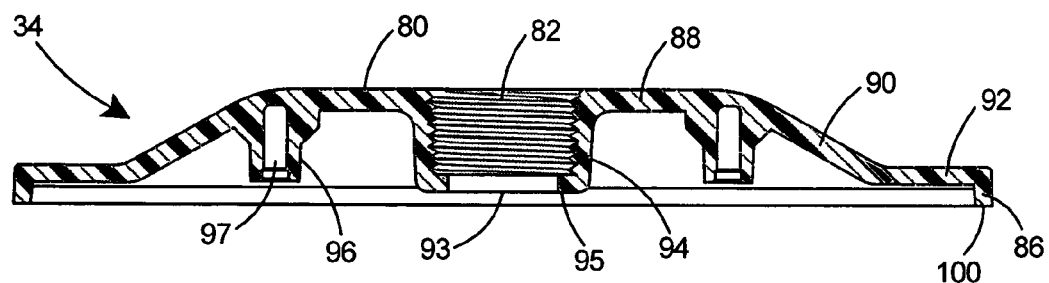
FIG. 5 is a sectional view of the mounting adapter taken along line 5-5 of FIG. 2.
Figure 6:
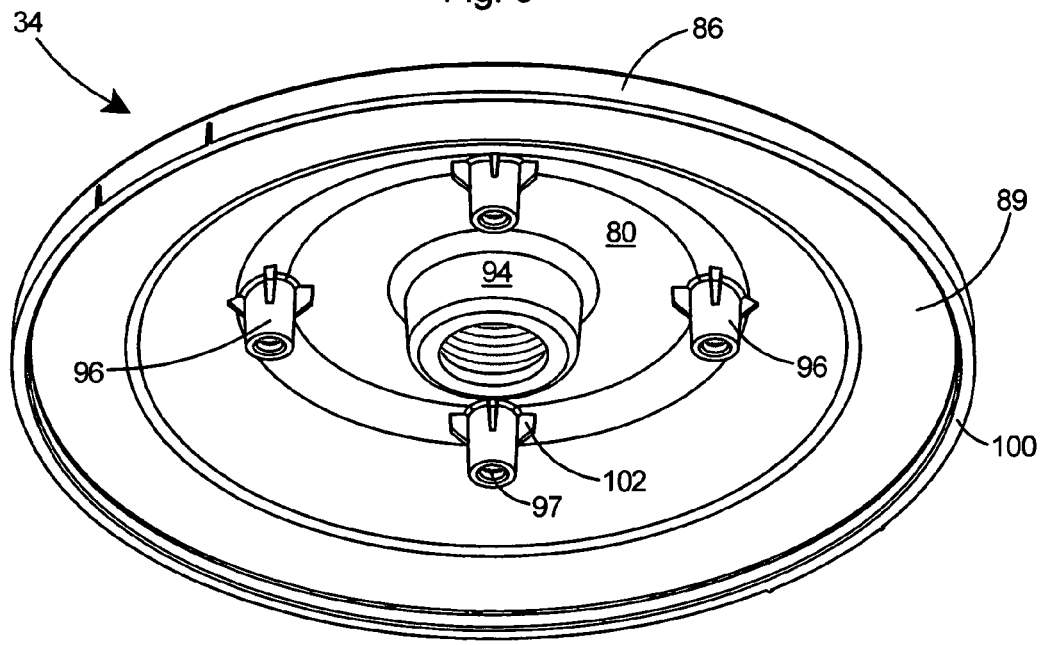
FIG. 6 is a bottom perspective view of the mounting adapter of FIG. 2.

Referring to FIGS. 4-6, the base plate 80 of the mounting adapter 34 includes a center wall portion 88, an inner surface 89, a sloped wall portion 90, an outer surface 91, and an outer wall portion 92. The peripheral wall is at a 90° degree angle with respect to the outer wall portion 92. The mounting adapter 34 further includes an internally threaded sleeve 94 extending from the inner surface 89 of the base plate 80 at the opening 82. The internally threaded sleeve 94 will enable screw-on attachment of the mounting adapter 34 and electrical box assembly to a threaded down rod (not shown). As shown in FIG. 5, the internally threaded sleeve 94 includes an end 93 and a peripheral lip 95 around the inner periphery of the sleeve 94. The peripheral lip 95 will limit the distance the mounting adapter 34 can be threaded onto a down rod (not shown) and thereby prevent the down rod from extending into the electrical box 32 and the electrical enclosure 46. The mounting adapter 34 further includes a plurality of plate bosses 96 extending from the base plate 80 and a rim 100 at the end of the peripheral wall 86. The plate bosses 96 include bores 97 therein. As shown in FIG. 5, the plate bosses 96 extend from the center wall portion 88 of the base plate 80, which as a result of sloped wall portion 90 positions the bosses above the rim 100 of the mounting adapter 34. A plurality of braces 102 extend from each plate boss 96 and anchor each boss to the base plate 80.

Figure 7:
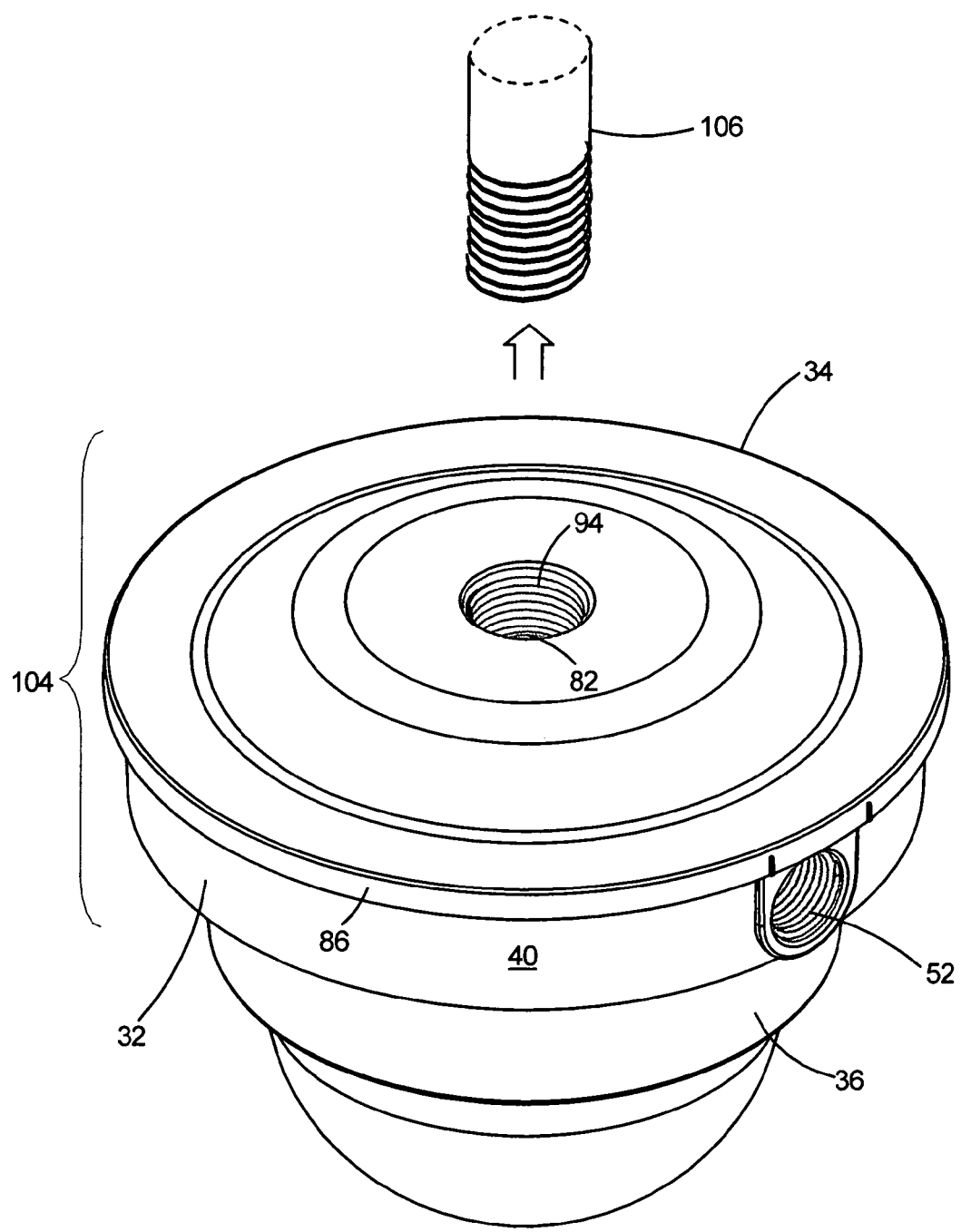
FIG. 7 is a perspective view of the camera mounting assembly of FIG. 1 with an attached security camera and in alignment with a down rod to be secured thereto.

With reference to FIG. 7, the electrical box 32 is typically secured to the mounting adapter 34 to form a camera support assembly 104. The camera support assembly 104 can be threaded onto a down rod 106 that is anchored to a ceiling. A security camera 36, detector, or light fixture is then be secured to the camera support assembly 104. Alternatively, for a flush mount against a ceiling or wall, the mounting adapter could be eliminated and the electrical box 32 mounted directly to the ceiling or wall by driving fasteners (not shown) through apertures 68 in the back wall 44 of the electrical box 32 into the ceiling or wall.

Figure 8:
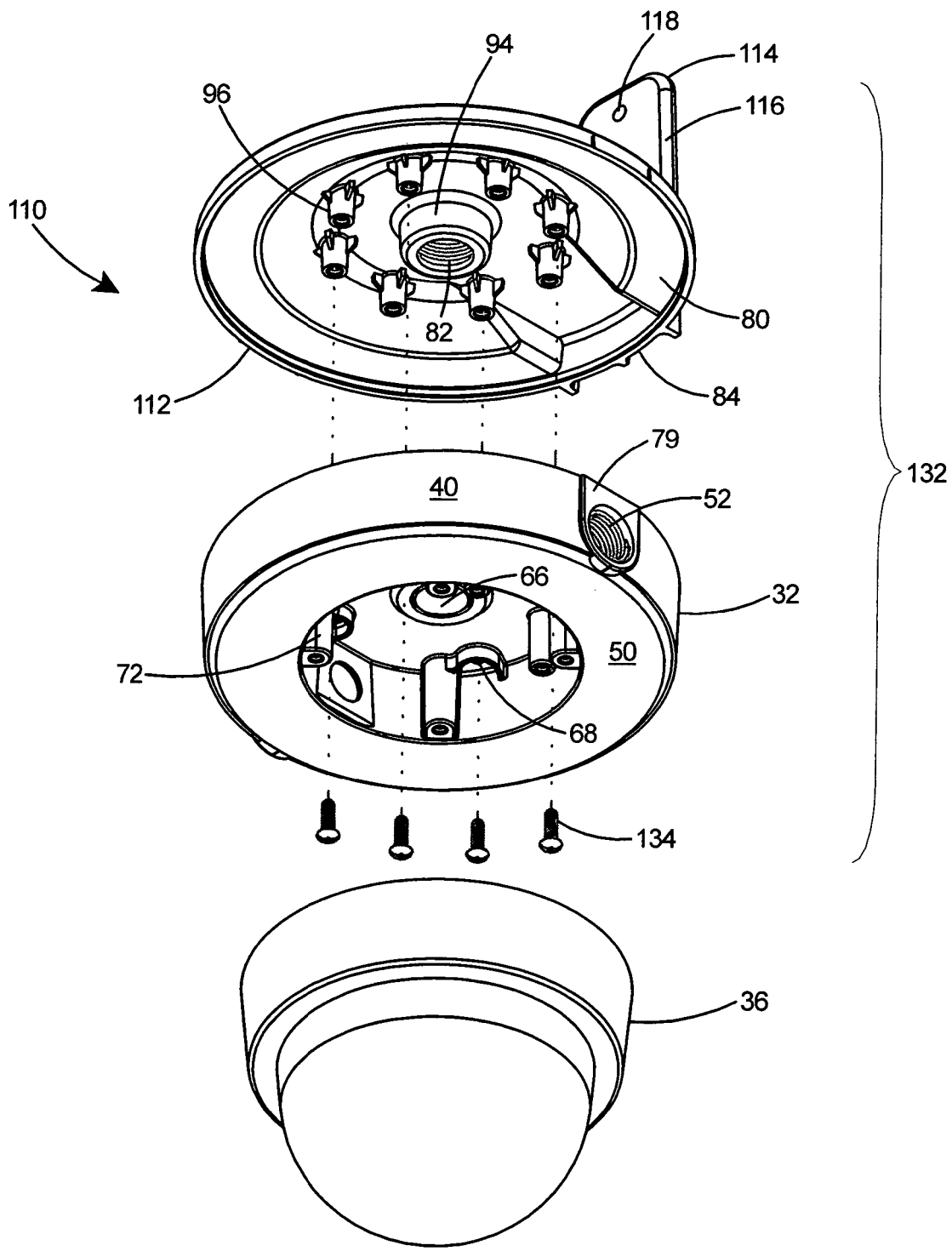
FIG. 8 is an exploded perspective view of a second embodiment of a camera mounting assembly according to the present invention.

Referring to FIG. 8 there is shown a second embodiment of a camera mounting assembly 110 according to the present invention including the one-piece electrical box 32 and an alternative or second embodiment of a mounting adapter 112. Mounting adapter 112 includes a bracket 114 integral with the base plate 80 at its edge 84. As shown in FIG. 8, mounting adapter 112 preferably includes eight plate bosses 96 spaced evenly around the base plate 80. Providing eight plate bosses 96 enables greater flexibility in positioning the cable passageways 52 of the electrical box 32 with respect to the mounting adapter 112. As an example, the camera mounting assembly 110 in FIG. 8 depicts the cable passageway 52 oriented at 90° with respect to the bracket 114. The electrical box 32 could be rotated in 45° increments in order to align the cable passageway 52 with a threaded conduit (not shown).

Figure 9:
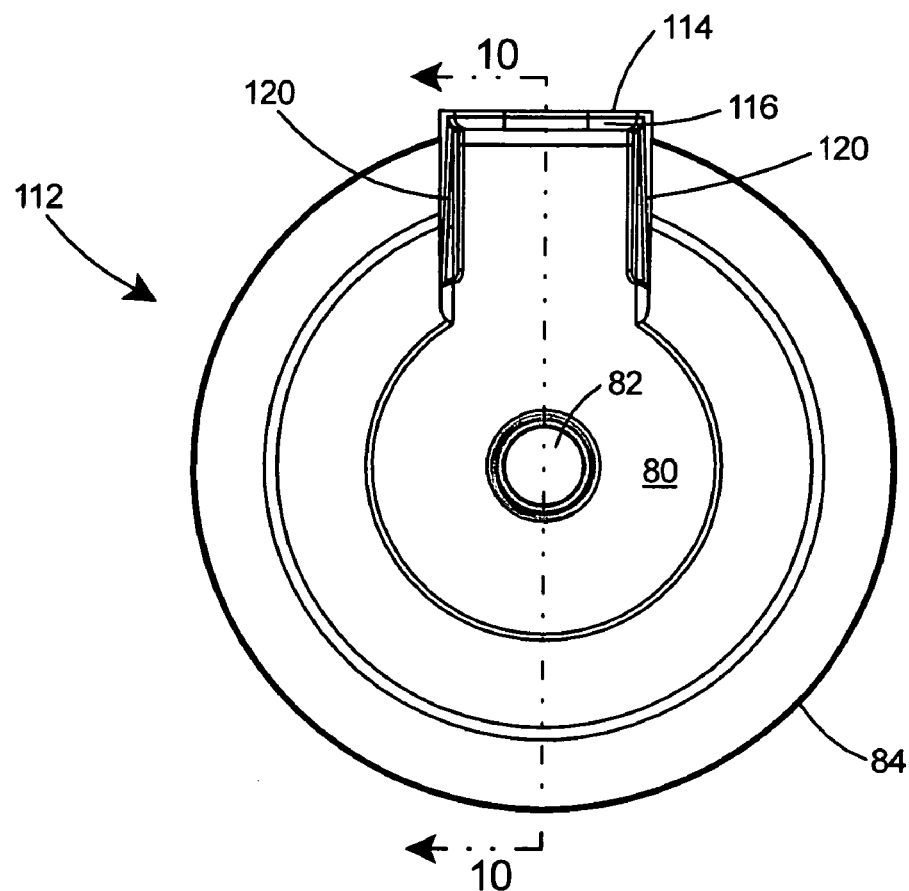
FIG. 9 is a top view of a second embodiment of a mounting adapter that forms a portion of the camera mounting assembly of FIG. 8.
Figure 10:
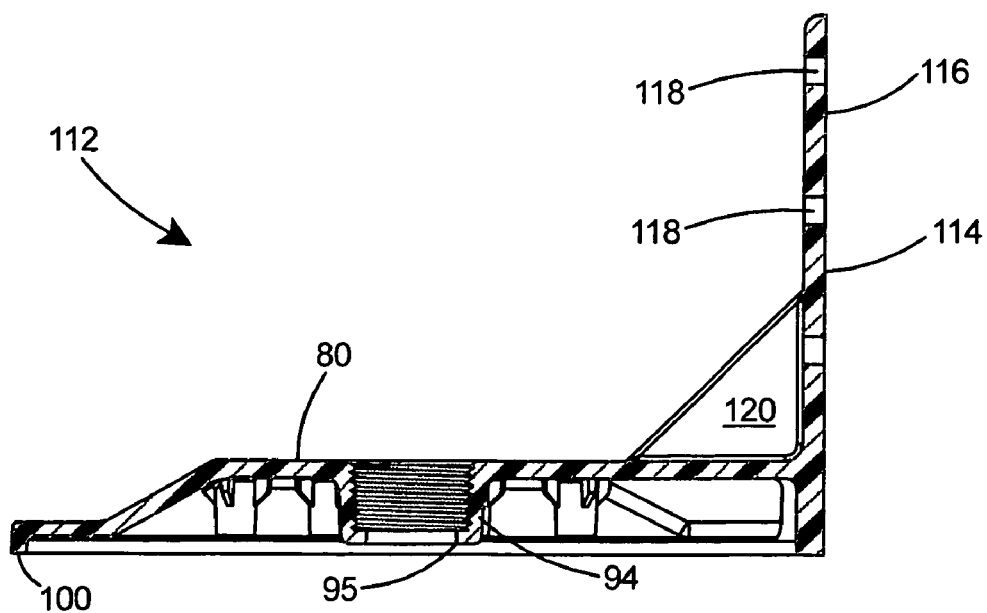
FIG. 10 is a sectional view of the mounting adapter taken along line 10-10 of FIG. 9.
Figure 11:
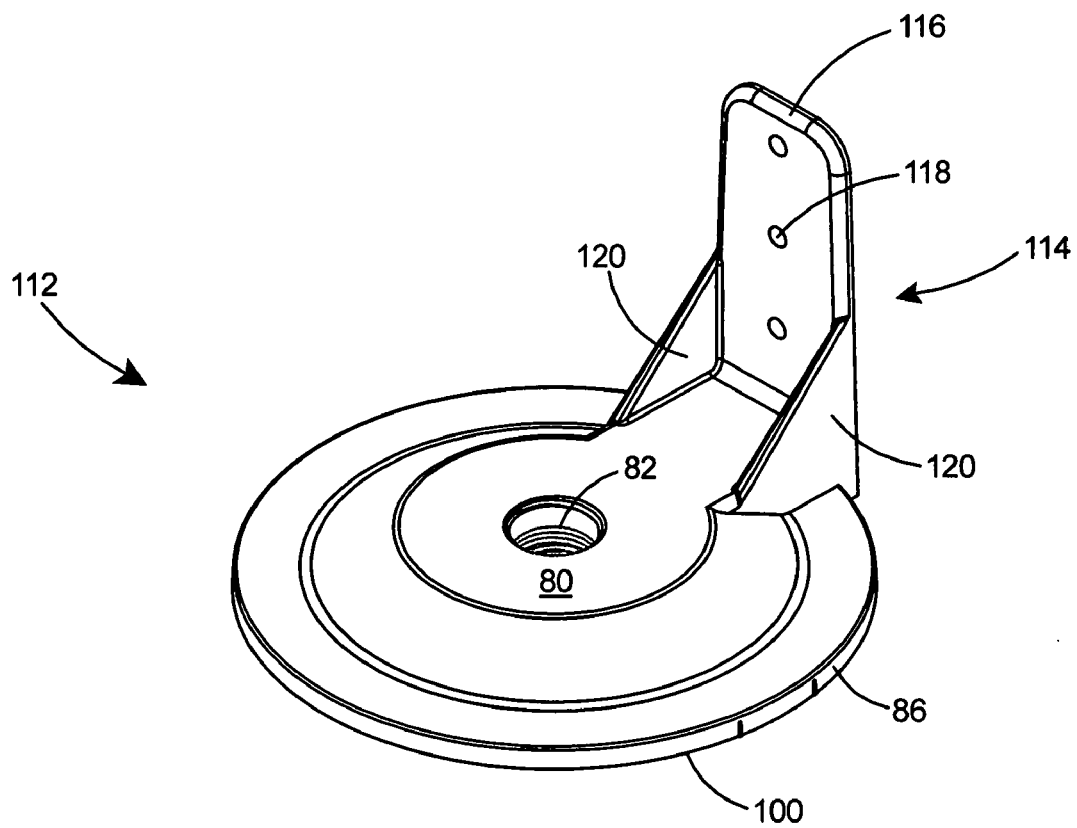
FIG. 11 is a top perspective view of the mounting adapter of FIG. 9.
Figure 12:
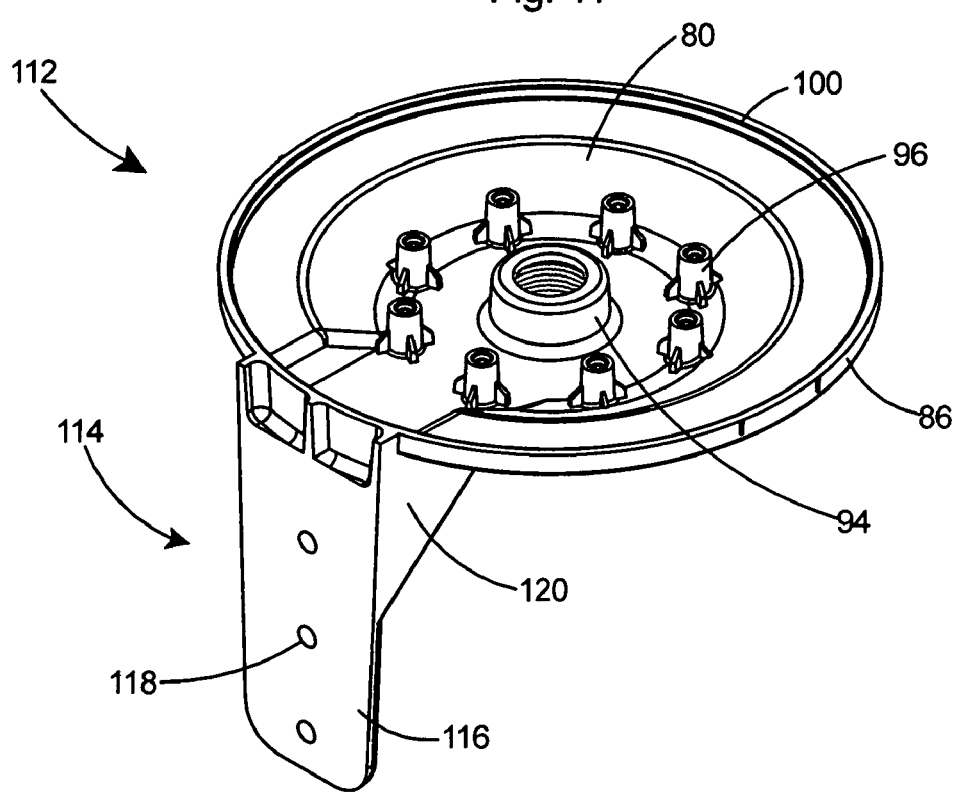
FIG. 12 is a bottom perspective view of the mounting adapter of FIG. 2.

As shown in FIGS. 9-10, the bracket 114 includes a flange 116 that is at an angle of 90° with respect to the rim 100 of the mounting adapter 112. The flange 116 includes a plurality of apertures 118 therein and two triangular shaped side braces 120 that support and strengthen the flange 116 with respect to the base plate 80.

Figure 21:
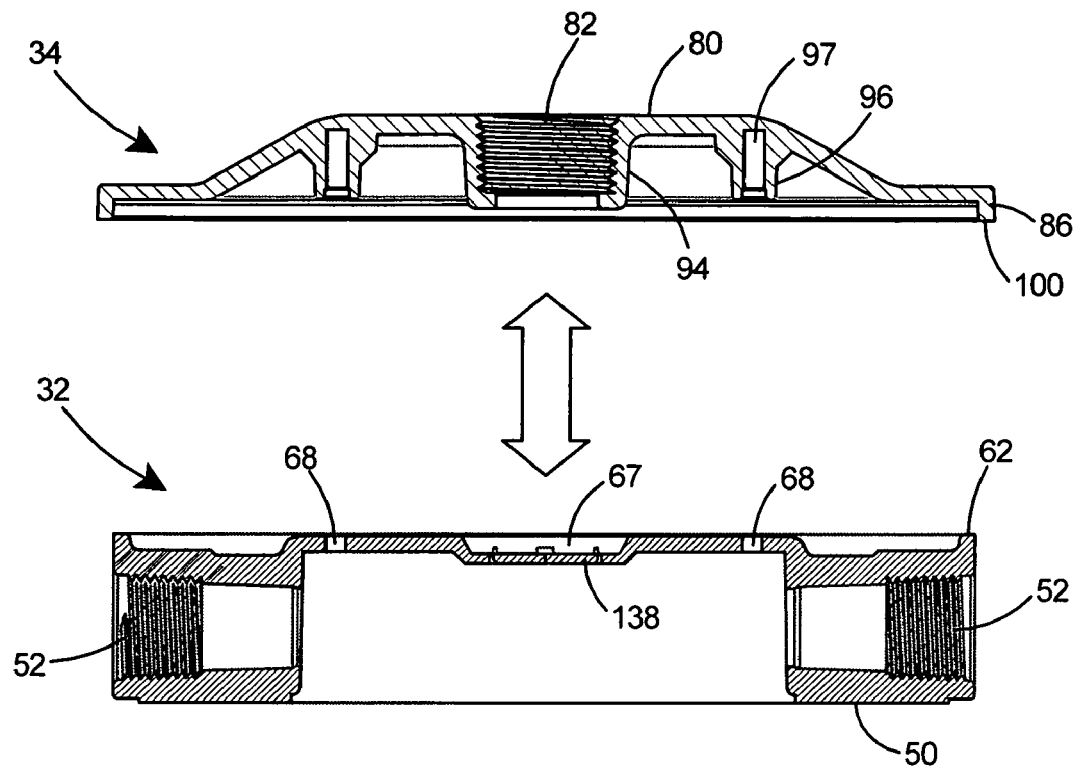
FIG. 21 is an exploded side view of the electrical box and the first embodiment of the mounting adapter in alignment to be joined together.
Figure 22:
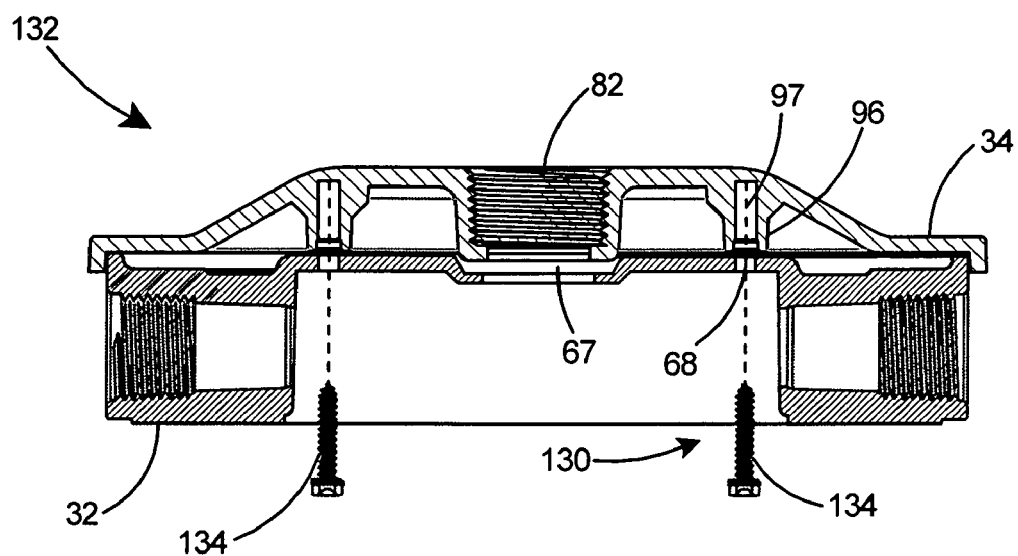
FIG. 22 is a side view of the electrical box and the mounting adapter of FIG. 21 after being joined together.

FIGS. 21 and 22 illustrate the details of an electrical box mounting arrangement 130 for joining the electrical box 32 and mounting adapter 34 together to form an electrical box and mounting adapter assembly 132. Fasteners 134 are inserted through the apertures 68 in the back wall 44 of the electrical box 32 and threaded into the bores 97 of the plate bosses 96 in the mounting adapter 34 thereby creating an electrical box and mounting adapter assembly 132. The electrical box 32 and mounting adapter 34 may be provided as an assembly 132. Although the first embodiment of the mounting adapter 34 is shown herein, it should be understood that the second embodiment of the mounting adapter 112 can also be secured to the electrical box 32 in order to form an electrical box and mounting adapter assembly (not shown). With reference to FIG. 8, as described hereinabove, if the cable passageway 52 is not in the desired alignment with respect to an electrical conduit, the electrical box 32 could be rotated in 45° increments until it is properly aligned with the electrical conduit (not shown). If the electrical box 32 and mounting adapter 34 are already formed into an electrical box and mounting adapter assembly, the installer simply removes the fasteners 134 (see FIG. 22), rotates the electrical box 32 with respect to the mounting adapter 34 until the cable passageway 52 is properly aligned, and then reinstalls the fasteners 134. The electrical box and mounting adapter assembly 132 include a central opening 67 in the back wall 44 of the electrical box 32. When aligned to be connected, the central opening 67 in the electrical box 32 is coaxial with the threaded sleeve 94 of the mounting adapter 34. As shown in FIG. 21, the back wall 44 of the electrical box 32 includes a knockout wall section 138 therein which can be removed by an installer. With the knockout section 138 removed for the mounting of a high voltage security camera (not shown), wiring for house current can be fed through a hollow down rod (not shown) to supply electrical power to the electrical box and mounting adapter assembly 132. The knockout wall section 138 is shown removed in the electrical box and mounting adapter assembly 132 of FIG. 22.

Figure 23:
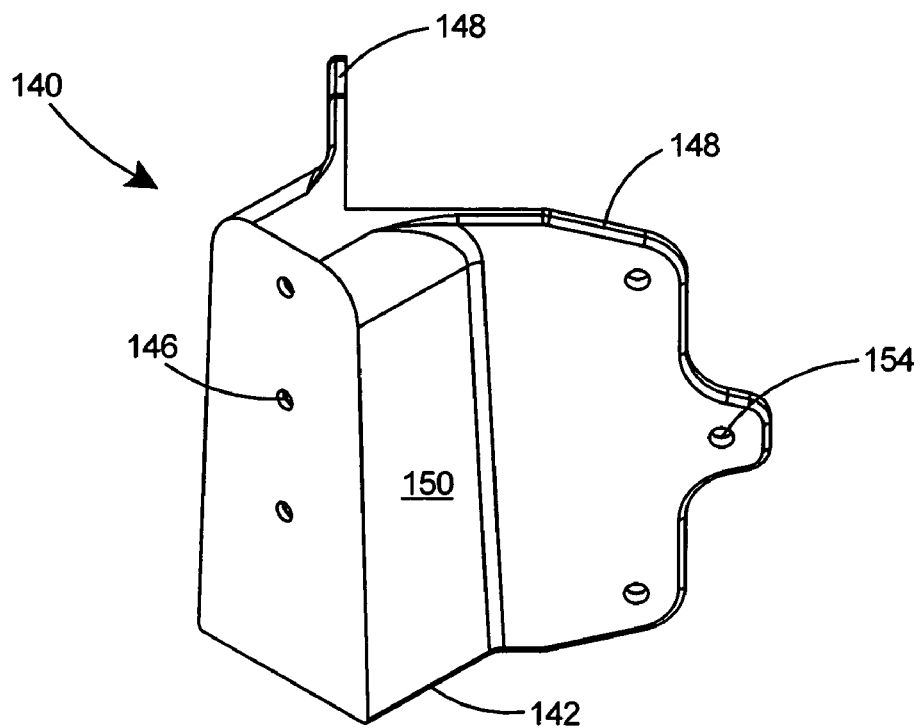
FIG. 23 is a front perspective view of a corner adapter according to the present invention.
Figure 24:
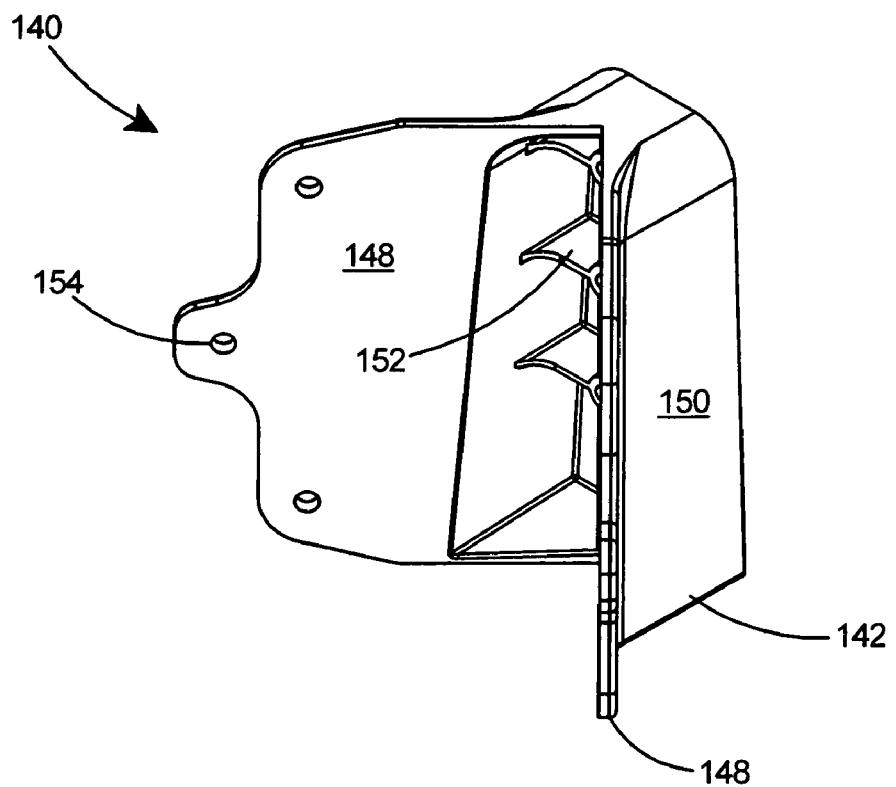
FIG. 24 is a rear perspective view of the corner adapter of FIG. 23.

Referring to FIGS. 23-24, there is shown a corner adapter 140 that enables securing the electrical box 32 and second embodiment of the mounting adapter 112 to an outside corner such as between two walls (not shown). The corner adapter 140 includes a base 142 with a base plate 144, a plurality of apertures 146 in the base plate 144, and two wings 148 each extending at substantially 45° from the base 142. The base 142 includes two side portions 150 and a plurality of struts 152 extending between the side portions 150. The wings 148 include a plurality of apertures 154 therein.

Figure 25:
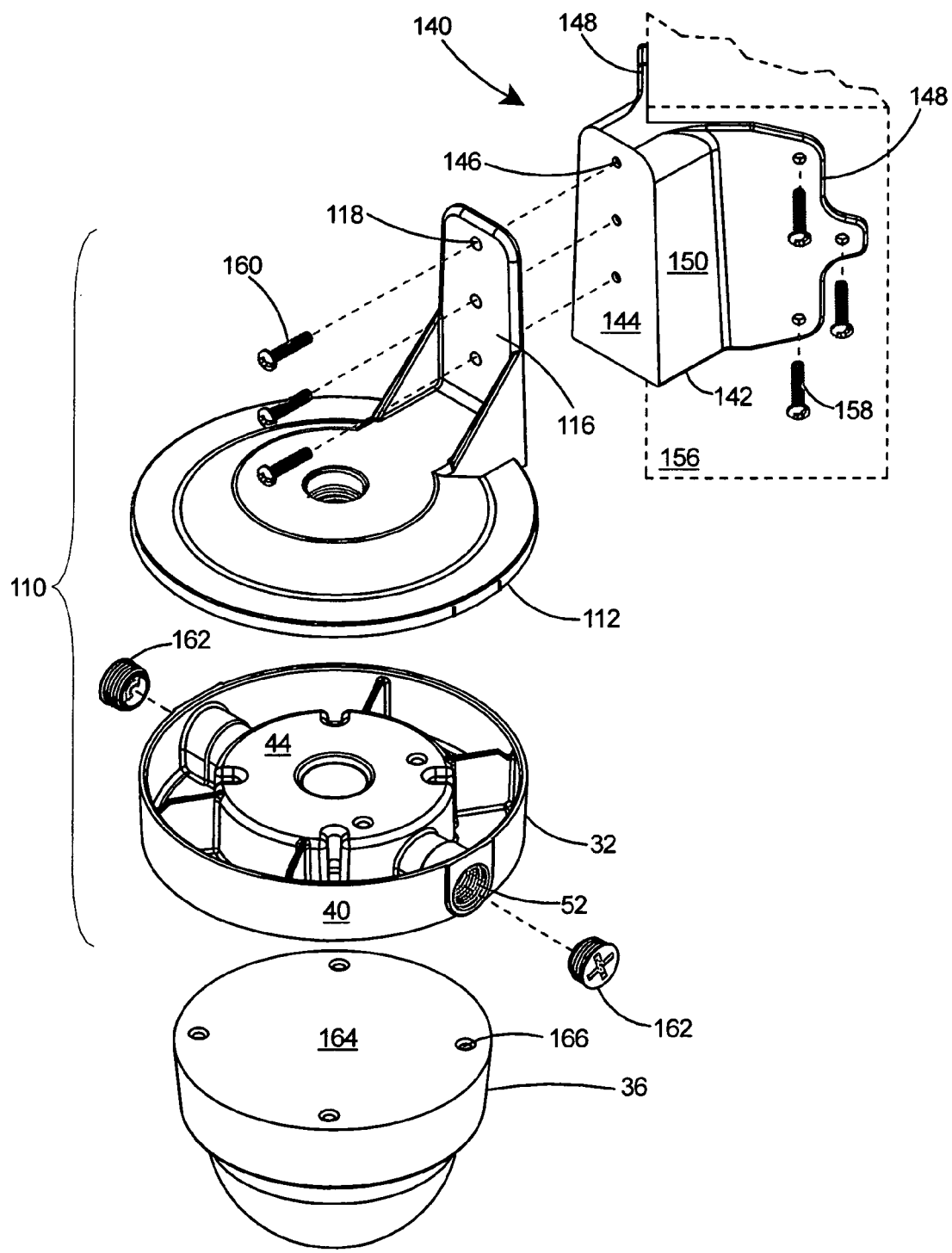
FIG. 25 is an exploded perspective view of the second embodiment of the camera mounting assembly in alignment with a corner adapter to be secured thereto.
Figure 26:
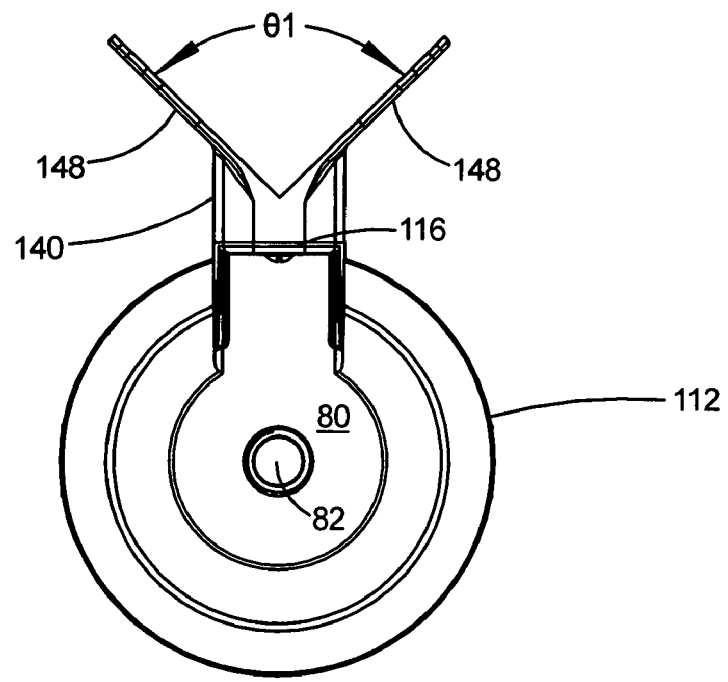
FIG. 26 is a top view of the camera mounting assembly and corner adapter of FIG. 25 after being secured together.

With reference to FIG. 25, there is shown a practical application of a camera mounting assembly 110 according to the present invention utilizing a corner adapter 140 to mount a security camera to a corner 156. The corner adapter 140 is secured to a corner 156 with fasteners 158 as shown. Camera mounting assembly 110, shown exploded apart in FIG. 25, is then secured to the corner adapter 140 with fasteners 160 as shown. Electrical box 32 is secured to the mounting adapter 112 in the manner described hereinabove. Threaded plugs 162 are secured within any unused cable passageways 52 to block any unused cable entrances to the electrical box 32. Security camera assemblies are typically supplied with a mounting plate 164 from the manufacturer. The installer typically drills holes 166 in the mounting plate 164 and drives fasteners there through in order to attach the security camera assembly 36 to the face plate (not shown) of the electrical box 32. As shown in FIG. 26, the angle $\Theta 1$ between the wings 148 of the corner adapter 140 is preferably 90°.

Figure 27:
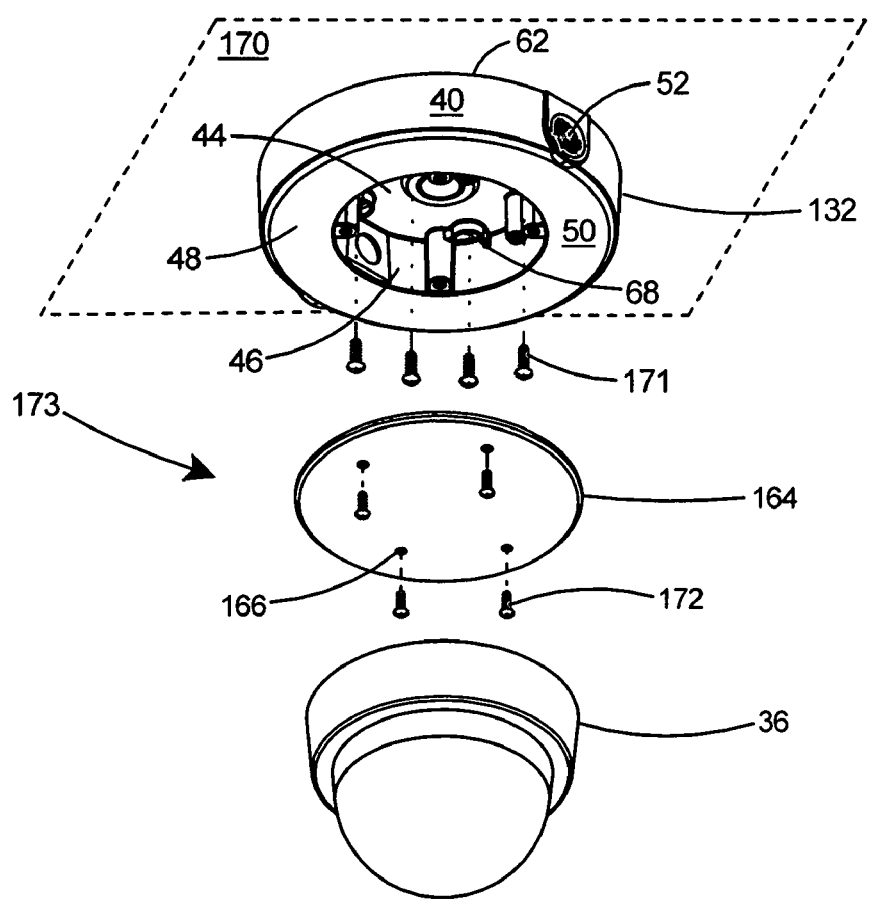
FIG. 27 is a perspective view of a camera mounting assembly wherein the electrical box of the present invention is mounted directly to a ceiling.

FIG. 27 depicts the mounting of a security camera 36 directly to the ceiling 170 of a structure. In those situations where a direct mounting to the wall is desirable, the electrical box can be mounted directly to the ceiling 170 by driving fasteners 171 through the apertures 68 in the back wall 44 of the electrical box 32. Electrical conduit (not shown) is connected to cable ports 52 as required and electrical wiring completed within the electrical enclosure 46. A security camera 36 is then secured to the electrical box 32 in the manner described hereinabove, with the installer drilling holes 166 as appropriate in the security camera's mounting plate 164 and in the flat surface 50 of face plate 48 and securing it thereto with fasteners 172. The camera mounting plate 164, fasteners 172, and face plate 48 thereby form a camera mounting arrangement 173 for mounting a security camera to any of the camera mounting assemblies of the present invention. Face plate 48 is preferably at least 0.140-inch thick.

Figure 28:
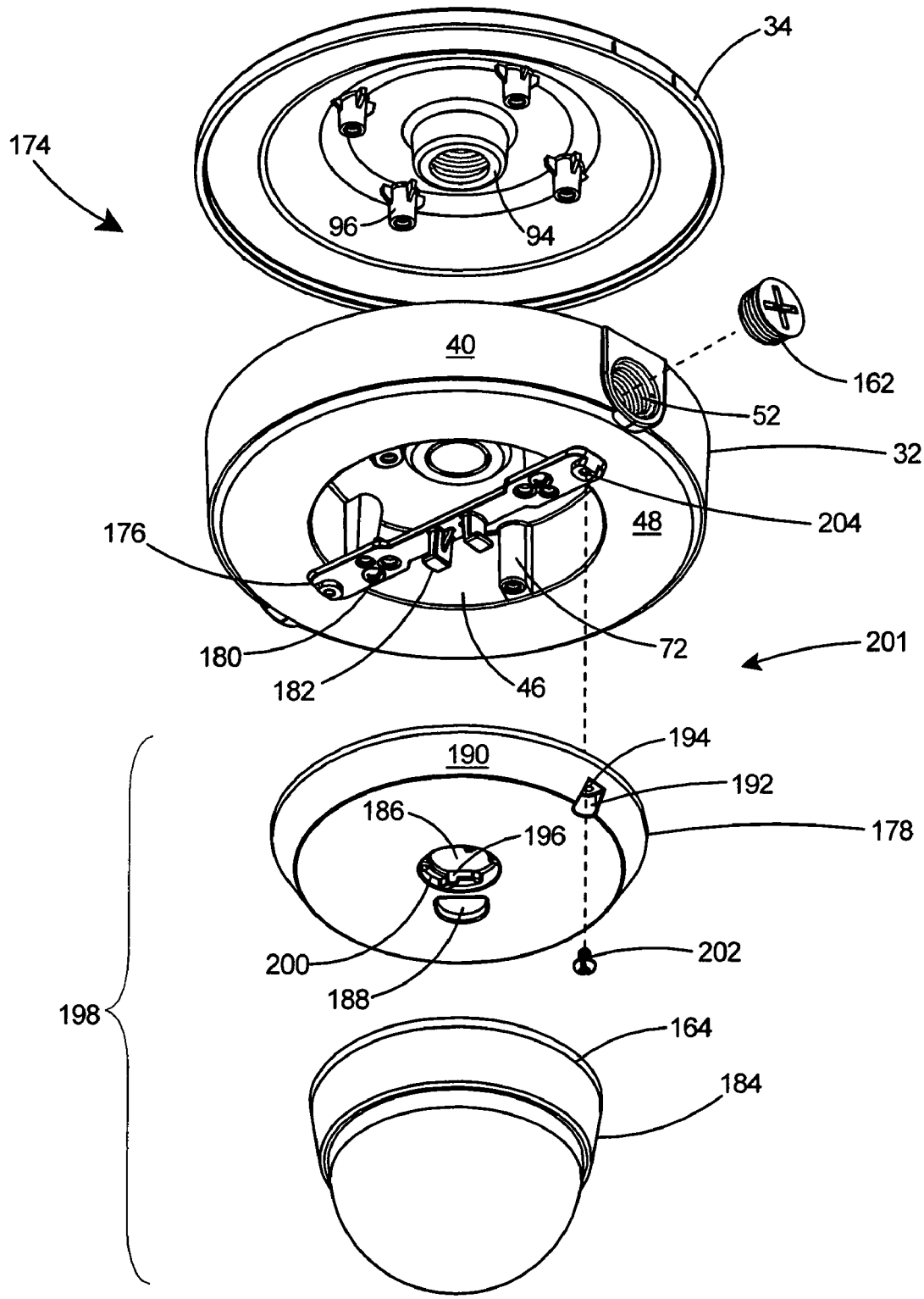
FIG. 28 is an exploded perspective view of a third embodiment of a camera mounting assembly according to the present invention.

With reference to FIG. 28 there is shown a third embodiment of a camera mounting assembly 174 according to the present invention, which embodiment is used to mount a small diameter security camera to the electrical box 32 of the present invention. This embodiment of the camera mounting assembly 174 includes a mounting bar 176 and adapter plate 178 such as shown and described in U.S. patent application Ser. No. 12/592,811, of which the entire contents have been incorporated herein by reference in their entirety. The mounting plates provided by the manufacturer for most conventional security cameras have a diameter of at least 4.5-inches, which enables mounting the plate directly to the face plate 48 of the electrical box as the diameter of the electrical enclosure 46 is typically approximately 4.0-inches. Some security camera mounting plates however have a diameter of less than 4.5-inches, which cannot be mounted directly to the face plate 48 of the electrical box 32. To mount such a small camera, mounting bar 176 is secured across the face of the electrical enclosure 46 with fasteners 180 driven into bosses 72 as shown in FIG. 28. Mounting bar 176 includes two prongs 182 extending from its approximate center. Small diameter security camera 184 is then secured to the adapter plate 178 by drilling holes in the adapter plate to match the hole pattern in the manufacturer-supplied mounting plate on the camera (not shown) and connecting the two with fasteners. Adapter plate 178 includes a central opening 186, a wiring opening 188, a peripheral wall 190, and a recessed area 192 with a bore 194 therein. The wall surrounding the central opening 186 includes a prong engagement member 196 thereon. For a high voltage camera, wiring is pulled through wiring opening 188 and wiring connections are completed inside the electrical enclosure 46 between the supply power and the camera wiring leads. Low voltage security cameras however typically run off of battery power, in which case the installation procedure is substantially the same except wiring is not pulled through the wiring opening. With the camera 184 now secured to the adapter plate 178, the installer simply presses the adapter plate 178 over the prongs 182 of the mounting bar 176 and rotates the camera and adapter plate assembly 198 one-quarter turn clockwise with respect to the electrical box 32 to effect a twist locking engagement of the camera and plate assembly 198 to the mounting bar 176 and thus to the electrical box 32. Flanges 200 extending into central opening 186 of adapter plate 178 provide a cam action to lock the camera and adapter plate assembly 198 onto the prongs 182 of mounting bar 176. The mounting bar 176 and prongs 182 and the central opening 186 in the adapter plate 178 form a twist-locking arrangement 201 for twist locking the adapter plate 178 to the mounting bar 176. Although shown exploded away in FIG. 28, the mounting adapter 34 and electrical box 32 could be secured together into an assembly prior to assembling the mounting bar 176 to the electrical box 32 and camera and plate assembly 198 to the electrical box 32. Typically, for a high voltage security camera, an installer would first connect the mounting adapter 34 and electrical box 32 assembly to a down rod (not shown) and pull electrical wiring into the electrical enclosure before proceeding with connection of the mounting bar 176 and the camera and plate assembly 198. To ensure a locking engagement of camera and plate assembly 198 to the electrical box 32 and prevent counterclockwise rotation of camera and plate assembly 198 with respect to the mounting bar 176, fastener 202 is secured through the bore 194 in the recessed area 192 of the adapter plate 178 into an end boss 204 on the mounting bar 176.

Figure 13:
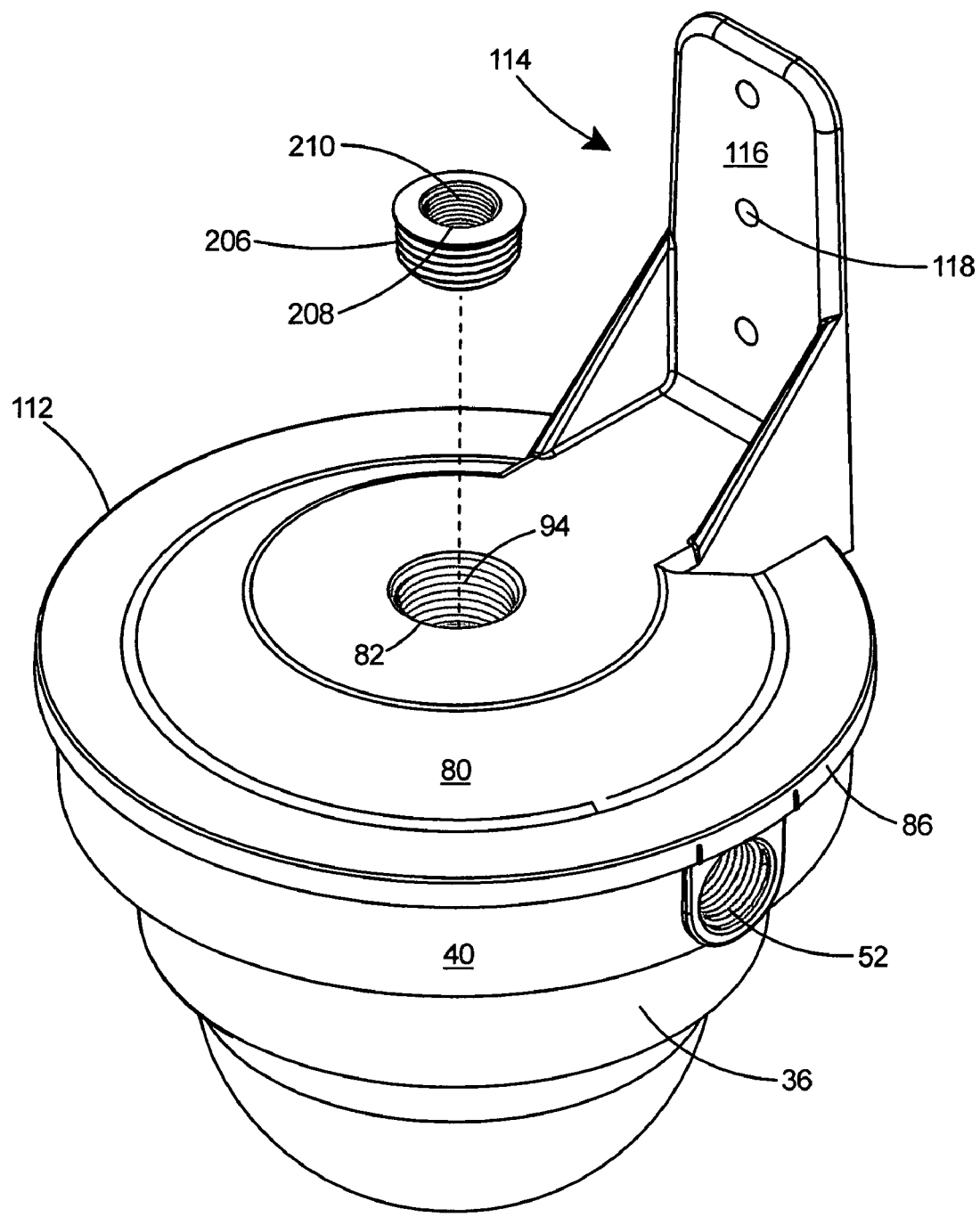
FIG. 13 is a perspective view of the camera mounting assembly of FIG. 8 after being completely assembled to support a security camera.

As shown with respect to mounting adapter 112 in FIG. 13, the mounting adapters of the present invention may further include a reducing bushing 206. The reducing bushing 206 is threaded therein into the threaded sleeve 94 of the mounting adapter 112 in order to adapt the mounting adapter for attachment to a smaller diameter down rod. The reducing bushing 206 includes a bore 208 there through and includes internal threads 210 to adapt the mounting adapter 112 for attachment to a smaller diameter down rod.

In the camera mounting assemblies according to the present invention, the electrical box 32, mounting adapters 34 and 112, mounting bar 176 and adapter plate 178 are preferably constructed of metal or plastic. Most preferably, the electrical box 32, mounting adapters 34 and 112, mounting bar 176 and adapter plate 178 are each molded in one piece of plastic. Preferably, the plastic is polyvinyl chloride, polycarbonate, acrylonitrile-butadiene styrene, or polyethylene.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:
1. A camera mounting assembly comprising:
   a mounting adapter including a base plate having an edge, a peripheral wall extending from said edge of said base plate, and a plurality of bosses extending from said base plate;
   an electrical box including an outer wall, an inner wall, and a face plate extending between said outer wall and said inner wall;
   said electrical box including a back wall integral with said inner wall and defining an electrical enclosure within said electrical box;
   an electrical box mounting arrangement for securing said electrical box to said mounting adapter;
   a camera mounting arrangement for mounting a security camera to said electrical box; and
   a fastening arrangement for mounting said mounting adapter to a surface; said fastening arrangement for mounting said mounting adapter to a surface includes an opening and an internally threaded sleeve in said base plate, said threaded sleeve enabling screw-on attachment of said mounting adapter and said electrical box to a threaded down rod.
2. The camera mounting assembly of claim 1 wherein said electrical box mounting arrangement includes
   a plurality of apertures in said back wall of said electrical box; and
   fasteners for securing through said apertures in said back wall of said electrical box into said bosses in said mounting adapter thereby forming an electrical box and mounting adapter assembly.
3. The camera mounting assembly of claim 2 wherein
   said base plate of said mounting adapter includes an inner surface, an outer surface, and an opening therein;
   an internally threaded sleeve extending from said inner surface of said base plate at said opening.
4. The camera mounting assembly of claim 3 wherein said electrical box and mounting adapter assembly include a central opening in said back wall of said electrical box, said central opening in said electrical box coaxial with said threaded sleeve of said mounting adapter.
5. The camera mounting assembly of claim 1 wherein said camera mounting arrangement includes
   a mounting plate secured to said security camera; and
   fasteners for driving through said mounting plate of said security camera into said face plate of said electrical box.
6. The camera mounting assembly of claim 1 wherein said camera mounting arrangement includes
   a mounting plate secured to said security camera;
   an adapter plate secured to said mounting plate;
   a mounting bar secured to said electrical box; and
   a twist-locking arrangement for twist locking said adapter plate to said mounting bar.
7. The camera mounting assembly of claim 6 wherein said twist-locking arrangement for twist locking said camera adapter plate to said mounting bar includes
   two prongs extending from said mounting bar; and
   a central opening in said adapter plate.
8. The camera mounting assembly of claim 7 including
   a prong engagement member in said adapter plate at said opening;
   a peripheral wall extending from said adapter plate; and
   a shelf in said peripheral wall of said adapter plate, said shelf including a bore therein,
   whereby said bore in said shelf enables acceptance of a fastener therein for secure engagement of said adapter plate to said mounting bar.
9. The camera mounting assembly of claim 1 including
   a plurality of bosses in said electrical enclosure, each of said bosses including a bore therein;

said bosses integral with said inner wall and said back wall of said electrical box; and said bores in said bosses of said electrical box capable of accepting fasteners from said camera mounting arrangement.

10. The camera mounting assembly of claim 1 including a peripheral wall in said electrical enclosure surrounding each of said apertures in said back wall, each of said peripheral walls integral with said back wall.

11. The camera mounting assembly of claim 1 including a reducing bushing in said threaded sleeve of said mounting adapter, said reducing bushing internally threaded to adapt said mounting adapter for attachment to a smaller diameter down rod.

12. The camera mounting assembly of claim 1 wherein said threaded sleeve includes an end and a peripheral lip therein at said end of said threaded sleeve, said peripheral lip limiting the distance of travel of said down rod within said sleeve and thereby preventing said down rod from extending into said electrical box.

13. A camera mounting assembly comprising:
a mounting adapter including a base plate having an edge, a peripheral wall extending from said edge of said base plate, and a plurality of bosses extending from said base plate;
an electrical box including an outer wall, an inner wall, and a face plate extending between said outer wall and said inner wall;
said electrical box including a back wall integral with said inner wall and defining an electrical enclosure within said electrical box;
an electrical box mounting arrangement for securing said electrical box to said mounting adapter;
a camera mounting arrangement for mounting a security camera to said electrical box;
a fastening arrangement for mounting said mounting adapter to a surface, wherein said fastening arrangement for mounting said mounting adapter to a surface includes a flange integral with and extending substantially orthogonally from said edge of said base plate; and
one or more apertures in said flange;
whereby said mounting adapter can be secured to said surface by driving fasteners through said flange into said surface.

14. A camera mounting assembly comprising:
a mounting adapter including a base plate having an edge, a peripheral wall extending from said edge of said base plate, and a plurality of bosses extending from said base plate;
an electrical box including an outer wall, an inner wall, and a face plate extending between said outer wall and said inner wall;
said electrical box including a back wall integral with said inner wall and defining an electrical enclosure within said electrical box;
an electrical box mounting arrangement for securing said electrical box to said mounting adapter;
a camera mounting arrangement for mounting a security camera to said electrical box;
a fastening arrangement for mounting said mounting adapter to a surface;
said electrical box includes a cable passageway extending between said outer wall and said inner wall, said cable passageway includes an outer end and an inner end; and
said cable passageway includes a threaded end at said outer end, whereby said threaded end of said cable passageway enables rotational attachment of threaded electrical conduit to said electrical box.

15. The camera mounting assembly of claim 14 wherein said cable passageway is bounded by a cylindrical wall extending between said outer wall and said inner wall of said electrical box.

16. The camera mounting assembly of claim 14 including a threaded plug for plugging said threaded end of said cable passageway between said outer wall and said inner wall of said electrical box.

17. A camera mounting assembly comprising:
a mounting adapter including a base plate having an edge, a peripheral wall extending from said edge of said base plate, and a plurality of bosses extending from said base plate;
an electrical box including an outer wall, an inner wall, and a face plate extending between said outer wall and said inner wall;
said electrical box including a back wall integral with said inner wall and defining an electrical enclosure within said electrical box;
an electrical box mounting arrangement for securing said electrical box to said mounting adapter;
a camera mounting arrangement for mounting a security camera to said electrical box;
a fastening arrangement for mounting said mounting adapter to a surface; and
said electrical box includes a plurality of struts extending between said outer wall and said inner wall.

18. A camera mounting assembly comprising:
a mounting adapter including a base plate having an edge, a peripheral wall extending from said edge of said base plate, and a plurality of bosses extending from said base plate;
an electrical box including an outer wall, an inner wall, and a face plate extending between said outer wall and said inner wall;
said electrical box including a back wall integral with said inner wall and defining an electrical enclosure within said electrical box;
an electrical box mounting arrangement for securing said electrical box to said mounting adapter;
a camera mounting arrangement for mounting a security camera to said electrical box;
a fastening arrangement for mounting said mounting adapter to a surface; and
said mounting adapter includes four of said bosses, said bosses enabling 90° incremental rotation of said electrical box with respect to said mounting adapter.

19. A camera mounting assembly comprising:
a mounting adapter including a base plate having an edge, a peripheral wall extending from said edge of said base plate, and a plurality of bosses extending from said base plate;
an electrical box including an outer wall, an inner wall, and a face plate extending between said outer wall and said inner wall;
said electrical box including a back wall integral with said inner wall and defining an electrical enclosure within said electrical box;
an electrical box mounting arrangement for securing said electrical box to said mounting adapter;
a camera mounting arrangement for mounting a security camera to said electrical box;
a fastening arrangement for mounting said mounting adapter to a surface; and
said mounting adapter includes eight of said bosses, said bosses enabling 45° incremental rotation of said electrical box with respect to said mounting adapter.

* * * * *